(12) United States Patent
Root (10) Patent No.: US 12,547,669 B2
(45) Date of Patent: Feb. 10, 2026

(54) ARTIFICIAL INTELLIGENCE-BASED PERSONALIZED CONTENT CREATION WORKFLOW

(71) Applicant: NOSTRA, INC., San Francisco, CA (US)

(72) Inventor: Arthur Blumenthal Root, San Francisco, CA (US)

(73) Assignee: NOSTRA, INC.

( * ) Notice: Subject to any disclaimer, the term of this patent is extended or adjusted under 35 U.S.C. 154(b) by 0 days.

(21) Appl. No.: 18/044,148

(22) PCT Filed: Apr. 21, 2022

(86) PCT No.: PCT/US2022/071835
§ 371 (c)(1),
(2) Date: Mar. 6, 2023

(87) PCT Pub. No.: WO2022/232754
PCT Pub. Date: Nov. 3, 2022

(65) Prior Publication Data
US 2023/0334114 A1  Oct. 19, 2023

Related U.S. Application Data

(60) Provisional application No. 63/179,845, filed on Apr. 26, 2021.

(51) Int. Cl.
*G06F 16/958* (2019.01)
*G06F 11/34* (2006.01)
(Continued)

(52) U.S. Cl.
CPC ........ *G06F 16/958* (2019.01); *G06F 11/3438* (2013.01); *G06F 16/9577* (2019.01); *H04L 67/02* (2013.01)

(58) Field of Classification Search
CPC .................................................. G06F 16/958
See application file for complete search history.

(56) References Cited

U.S. PATENT DOCUMENTS 9,852,229 B2 * 12/2017 Stellanova ........ G06F 17/30905
2004/0230441 A1 * 11/2004 Reilly ..................... G06F 17/60
(Continued)

OTHER PUBLICATIONS

Kumar, Srijan, Xikun Zhang, and Jure Leskovec. "Predicting dynamic embedding trajectory in temporal interaction networks." Proceedings of the 25th Acm Sigkdd international conference on knowledge discovery & data mining. 2019.
(Continued)

*Primary Examiner* — James J Debrow
(74) *Attorney, Agent, or Firm* — Daylight Law, P.C.

(57) ABSTRACT

A system and methodology for creating bespoke content tailored to each user in a user environment, including a bespoke content generator configured to autogenerate and test bespoke content in real-time and at least one machine learning platform. The at least one machine learning platform is configured to: autogenerate a landing webpage based on an interest level of all previously converted users from a same or similar followed generated multimedia content; monitor interaction with the landing webpage by a communicating device; and autogenerate on-the-fly and in real-time one or more subsequent webpages based on the interaction. The subsequent webpages are generated as the communicating device interacts with each webpage and progresses according to a predicted interaction trajectory.

12 Claims, 7 Drawing Sheets (51) Int. Cl.
  *G06F 16/957*   (2019.01)
  *H04L 67/02*    (2022.01)

(56) References Cited

U.S. PATENT DOCUMENTS

| | | | |
|---|---|---|---|
| 2014/0032467 A1 | 1/2014 | Reddy et al. | |
| 2018/0336169 A1* | 11/2018 | Cruz et al. | G06F 17/2235 |
| 2020/0137443 A1 | 4/2020 | McEnroe et al. | |
| 2020/0160229 A1* | 5/2020 | Atcheson | G06N 99/005 |
| 2020/0226418 A1* | 7/2020 | Dorai-Raj et al. | G06K 9/6256 |
| 2021/0042796 A1* | 2/2021 | Khoury et al. | G06Q 30/0276 |
| 2021/0073891 A1 | 3/2021 | Al Jadda et al. | |
| 2021/0201351 A1* | 7/2021 | Nag et al. | G06Q 30/0256 |

OTHER PUBLICATIONS

Capatina, Alexandru, et al. "Matching the future capabilities of an artificial intelligence-based software for social media marketing with potential users' expectations." Technological Forecasting and Social Change 151 (2020): 119794.

Mitchell, "6 Ways AI Can Improve Content Creation," Cloud Academy, May 19, 2020 (May 5, 2020), retrieved on May 28, 2022 (May 28, 2022) from <<https://cloudacademy.com/blog/6-ways-ai-can-improve-content-creation/>> entire document.

International Search Report issued in PCT/US2022/071835, mailed Jun. 16, 2022.

Extended European Search Report dated Jan. 31, 2025 from European Application No. 22796944.1, 10 pages.

\* cited by examiner

FIG. 7

ARTIFICIAL INTELLIGENCE-BASED PERSONALIZED CONTENT CREATION WORKFLOW

CROSS REFERENCE TO RELATED APPLICATIONS

This is a U.S. National Phase Patent Application under 35 U.S.C. § 371 of International Patent Application No. PCT/US2022/071835, filed Apr. 21, 2022, and claims priority to provisional U.S. Patent Application No. 63/179,845, filed Apr. 26, 2021, which is hereby incorporated herein by reference in its entirety. The International Application was published on Nov. 3, 2022, as International Publication No. WO 2022/232754 A1.

TECHNICAL FIELD

The present disclosure relates generally to multimedia content development and creation and, more particularly to machine learning-based multimedia content development, creation, and testing in a computer network.

BACKGROUND

In a computer-networked environment such as the Internet, content providers supply multimedia content for rendering at end-user computing devices. The multimedia content typically includes audio-visual content that can be displayed as one or more webpages. Generally, content providers create the multimedia content to be compatible with end-user browsers. An unfulfilled need exists for a computer platform that can be uploaded with multimedia content and webpages designed and created on-the-fly and made accessible to large groups of end-users through end-user browsers, with various features included in the multimedia content being fully functional and optimized to each individual end-user.

SUMMARY OF THE DISCLOSURE

The present disclosure provides a technological solution that meets that need and others by providing a multimedia content platform that can customize content to each end-user. The technological solution includes, in various embodiments, a system, a method and a computer platform for receiving multimedia content, generating bespoke content, and transmitting bespoke content to communicating devices for local rendering on a display or sound generation device. The bespoke content can be generated in real-time and tailored to each end-user in a user environment.

In an embodiment, a system is provided for creating bespoke content tailored to each user in a user environment. The system comprises a bespoke content generator configured to autogenerate and test bespoke content in real-time and at least one machine learning platform. The at least one machine learning platform is configured to: autogenerate a landing webpage based on an interest level of all previously converted users from a same or similar followed generated multimedia content; monitor interaction with the landing webpage by a communicating device; and autogenerate on-the-fly and in real-time one or more subsequent webpages based on the interaction. The subsequent webpages are generated as the communicating device interacts with each webpage and progresses according to a predicted interaction trajectory. The system can further comprise an interface configured to communicate with the communicating device and grant access to a site hosted on a bespoke content generator server. The bespoke content generator can be configured to determine efficacy for each autogenerated webpage. The autogenerated webpage can include a vector-variable autogenerated by the machine learning platform based on past interaction trajectories. The vector-variable can include a variation of the multimedia content autogenerated by the machine learning platform based on the predicted interaction trajectory. The at least one machine learning platform can include a vector-variable generator configured to autogenerate the landing webpage and the one or more subsequent webpages, and a vector-variable monitor configured to monitor the interaction with the landing page. The at least one machine learning platform can be configured to monitor an interaction with each of the one or more subsequent webpages by the communicating device and autogenerate on-the-fly and in real-time one or more additional subsequent webpages based on the interaction and the predicted interaction trajectory.

In an embodiment, a non-transitory computer-readable storage medium is provided, containing computer executable instructions that, when executed by a computing device, cause the computing device to interact with a communicating device and to perform a method, comprising: receiving a request from a communicating device for content; selecting a machine learning model based on the request; autogenerating a landing webpage by the machine learning model; monitoring interaction with the landing webpage by the communicating device; predicting, by the machine learning model, an interaction trajectory for the communicating device; autogenerating on-the-fly one or more subsequent webpages based on the monitored interaction and the predicted interaction trajectory; and determining whether conversion is complete and the content or one or more vector variables are launchable on the Internet. The method can include: updating the machine learning platform, including parametric values for at least one interaction trajectory; or receiving vector-variable and delivery medium selection parameters from another communicating device; or predicting an efficacy of the received vector-variable and a plurality of vector-variables autogenerated by the machine learning platform; or monitoring interaction with each of the one more subsequent webpages by the communicating device and autogenerating on-the-fly one or more additional subsequent webpages based on the interaction and the predicted interaction trajectory.

In an embodiment, a computer-implemented method is provided, wherein the method comprises: receiving by a machine learning platform a multimedia content from a first communicating device; receiving by the machine learning platform a request from a second communicating device to access the multimedia content; autogenerating by the machine learning platform one or more vector-variables of the multimedia content; providing, by the machine learning platform, the one or more vector-variables to the second communicating device; monitoring, by the machine learning platform, interaction by the second communicating device with the one or more vector-variables; predicting, by the machine learning model, an interaction trajectory for the second communicating device; autogenerating on-the-fly one or more subsequent vector-variables based on the monitored interaction and the predicted interaction trajectory; and determining whether conversion is complete and the multimedia content or one or more vector-variables are launchable on the Internet. The method can include: updating the machine learning platform, including parametric values for at least one interaction trajectory; or monitoring interaction with each of the one more subsequent webpages by the communicating device and autogenerating on-the-fly one or more additional subsequent webpages based on the interaction and the predicted interaction trajectory. The multimedia content can comprise a webpage containing audio-visual content. The one or more vector-variables can contain machine learning generated variations of the audio-visual content.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure, and together with the detailed description serve to explain the principles of the disclosure. No attempt is made to show structural details of the disclosure in more detail than may be necessary for a fundamental understanding of the disclosure and the various ways in which it may be practiced.

The present disclosure is further described in the detailed description that follows.

DETAILED DESCRIPTION OF THE DISCLOSURE

The disclosure and its various features and advantageous details are explained more fully with reference to the non-limiting embodiments and examples that are described or illustrated in the accompanying drawings and detailed in the following description. It should be noted that features illustrated in the drawings are not necessarily drawn to scale, and features of one embodiment can be employed with other embodiments as those skilled in the art would recognize, even if not explicitly stated. Descriptions of well-known components and processing techniques may be omitted so as to not unnecessarily obscure the embodiments of the disclosure. The examples are intended merely to facilitate an understanding of ways in which the disclosure can be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

The Internet is a network of networks that carries a vast range of computer resources over a global system of interconnected computer networks that use the Internet protocol suite (transmission control protocol/Internet protocol (TCP/IP)) to link communicating devices worldwide. The computer resources can include, for example, multimedia content (for example, audio-visual content), inter-linked hypertext documents, and applications of the World Wide Web (WWW), electronic mail, telephony, file sharing, computer-executable code or instructions, or data. Hypertext is one of the underlying concepts of the WWW, where a computer resource such as web content or a webpage can be written in Hypertext Markup Language (HTML). Hypertext computer resources can either be static or dynamic. Static computer resources can be prepared and stored in advance. Dynamic computer resources can change continually, such as in response to an input or activity on a communicating device.

Figure 1:
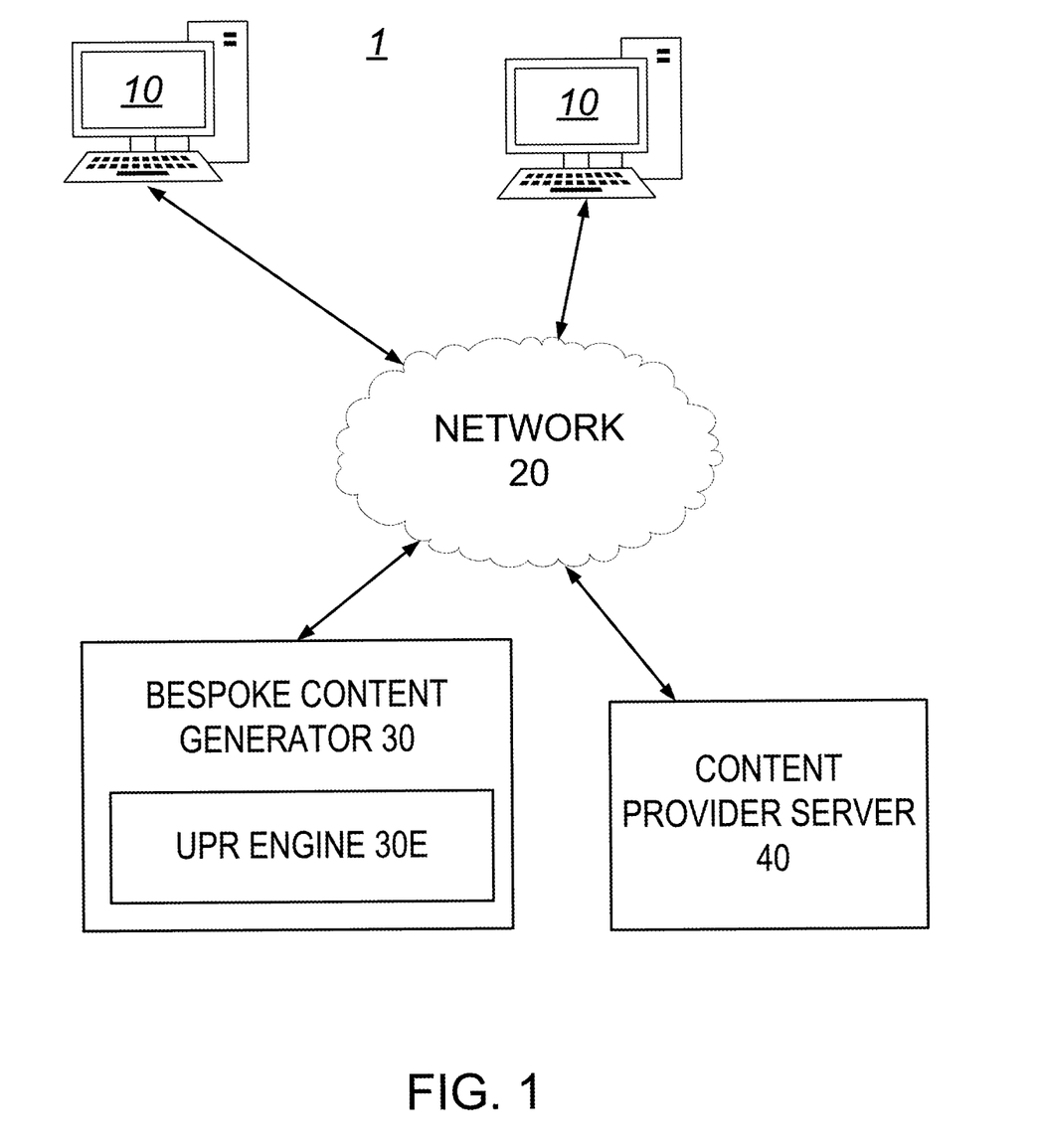
FIG. 1 depicts an embodiment of a user environment that includes a bespoke content generation system, according to the principles of the disclosure.

FIG. 1 shows a non-limiting embodiment of a user environment 1 that includes a bespoke content generation system, according to the principles of the disclosure. The user environment 1 includes a plurality of communicating devices 10, a network 20, and a bespoke content (BC) generator 30. The user environment 1 can include a content provider server 40. The BC generator 30 can include a machine learning (ML) platform having a user personalization recommendation (UPR) engine 30E. The BC generator 30 can be arranged to receive and send multimedia content from/to any of the communicating devices 10 or the content provider server 40.

The communicating device 10 can include a web browser having one or more web application programming interfaces (Web APIs) configured to access computer resources on the Internet. An application programming interface (API) can include a set of subroutine definitions, protocols, and tools for building software and applications. A Web API is an API that can be accessed and interacted with using Hypertext Transfer Protocol (HTTP) commands. The HTTP protocol can define what actions the web browsers in the communicating devices 10 should take in response to various commands.

When an end-user communicating device 10 visits a website or otherwise accesses a computer resource on the network 20, the device's web browser can retrieve the computer resource from a web server (not shown) that hosts the website or computer resource. In order to render a computer resource such as, for example, a webpage containing multimedia content, the browser may need to access multiple web resource elements, such as style sheets, scripts, and images, while presenting the computer resource as, for example, a webpage. The Internet and, more specifically, the end-user browsers are designed to work for all end-users, irrespective of any individual end-user's preferences. Thus, one of the challenges experienced by content providers is the lack of an ability to efficiently and effectively design and create multimedia content customized to each end user's preferences, including the manner in which the multimedia content is arranged when reproduced at the end-user communicating devices 10, including full functionality of all features included in the content.

Currently, content providers typically implement split-run testing methodologies (also known as A/B testing, bucket testing, or randomized testing) for hypothesis testing when designing or creating multimedia content. The methodologies generally involve creating two variants of a vector-variable and testing end-users' responses to one variant of the vector-variable against the other to determine which of the two is more effective. Such methodologies, however, have numerous shortcomings, such as, for example, lack of user-specific customizability, dependence on skilled human designers, and lengthy testing periods due to the substantial human involvement necessary.

This disclosure provides a technological solution that overcomes those and other shortcomings of content creation, including testing methodologies. The technological solution includes an interactive system, methodology, and computer platform that allows content providers to generate, test, and optimize multimedia content to each end-user's unique preferences. The solution allows content providers to design content on-the-fly and test it across all end-user communicating devices 10. The solution allows the content providers to create platform-agnostic computer resources having optimal navigational structure tailored to the individual end-user, including arrangement and positioning of content with dynamic interactability.

Figure 2:
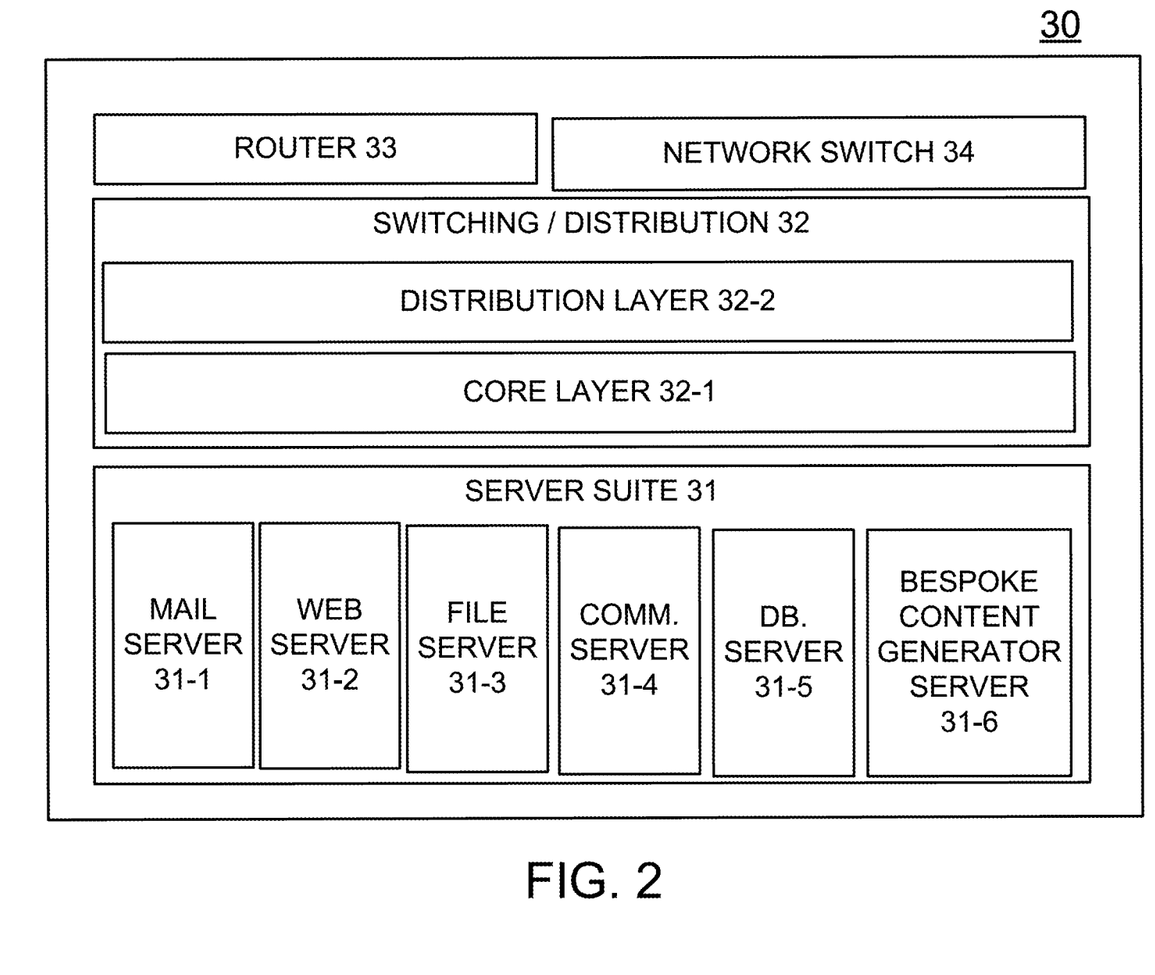
FIG. 2 depicts a block diagram of an embodiment of a bespoke content generator, according to the principles of the disclosure.

FIG. 2 depicts an embodiment of a BC generator 30 constructed according to the principles of the disclosure. The BC generator 30 includes a plurality of computing devices and computing resources. The computing devices and computing resources can include, for example, a server suite 31, one or more switching and distribution layers 32, one or more routers 33, or one or more network switches 34, any of which can be interconnected by communication links.

The server suite 31 can include one or more servers, including, for example, a mail server 31-1, a web server 31-2, a file server 31-3, a communication server 31-4, a database server 31-5, or a bespoke content generator (BCG) server 31-6. The BCG server 31-6 can include the ML platform equipped with the UPR engine 30E (shown in FIG. 1). Each of the servers in the server suite 31 can be co-located or can be distributed in two or more locations. The server suite 31 can include a server farm or a server cloud. The server suite 31 can include large numbers of computing devices and computing resources that are accessible to the communicating devices 10 in the user environment 1.

In various embodiments, UPR engine 30E can include a machine learning platform containing supervised machine learning, unsupervised machine learning or both supervised and unsupervised machine learning. The machine learning platform can include, for example, Generative Pre-trained Transformer 3 (GPT-3), an artificial neural network (ANN), a convolutional neural network (CNN), a temporal convolutional network (TCN), a deep CNN (DCNN), a region-based CNN (RCNN), a Mask-RCNN, a deep convolutional encoder-decoder (DCED), a recurrent neural network (RNN), a neural Turing machine (NTM), a differential neural computer (DNC), a support vector machine (SVM), a deep learning neural network (DLNN), a long short-term memory (LSTM), Naive Bayes, decision trees, linear regression, Q-learning, temporal difference (TD), deep adversarial networks, fuzzy logic, or any other machine intelligence platform capable of supervised or unsupervised machine learning. The PR system can include one or more platform-neutral or platform-agnostic APIs. The PR system can include, for example, Standard Regression (SR), Support Vector Regression (SVR), Ridge Regression (Ridge), Random Forest (RF), Autoregressive Integrated Moving Average (ARIMA), Vector Auto Regression (VAR), Arbitrage of Forecasting Expert (AFE), Extra-Tree Regression (ETR), Multilayer Perceptron (MLPR), or Vector Error Correction Model (VECM), or another statistical forecasting technology.

The switching and distribution layers 32 can include a core layer 32-1 and a distribution layer 32-2. The core layer 32-1 can include one or more layers of switching devices (not shown) that connect the server suite 31 to the distribution layer 32-2. The distribution layer 32-2 can include one or more layers of switching devices (not shown) that connect the core layer 32-1 to the one or more routers 33 or the one or more network switches 34. The switching and distribution layers 32 can include one or more routers (not shown). The router(s) 33 can be configured to connect to the network 20, which can include the Internet. The network switch(es) 34 can include ethernet switches. Data packets can be securely transported between computing resources in the BC generator 30.

Figure 3:
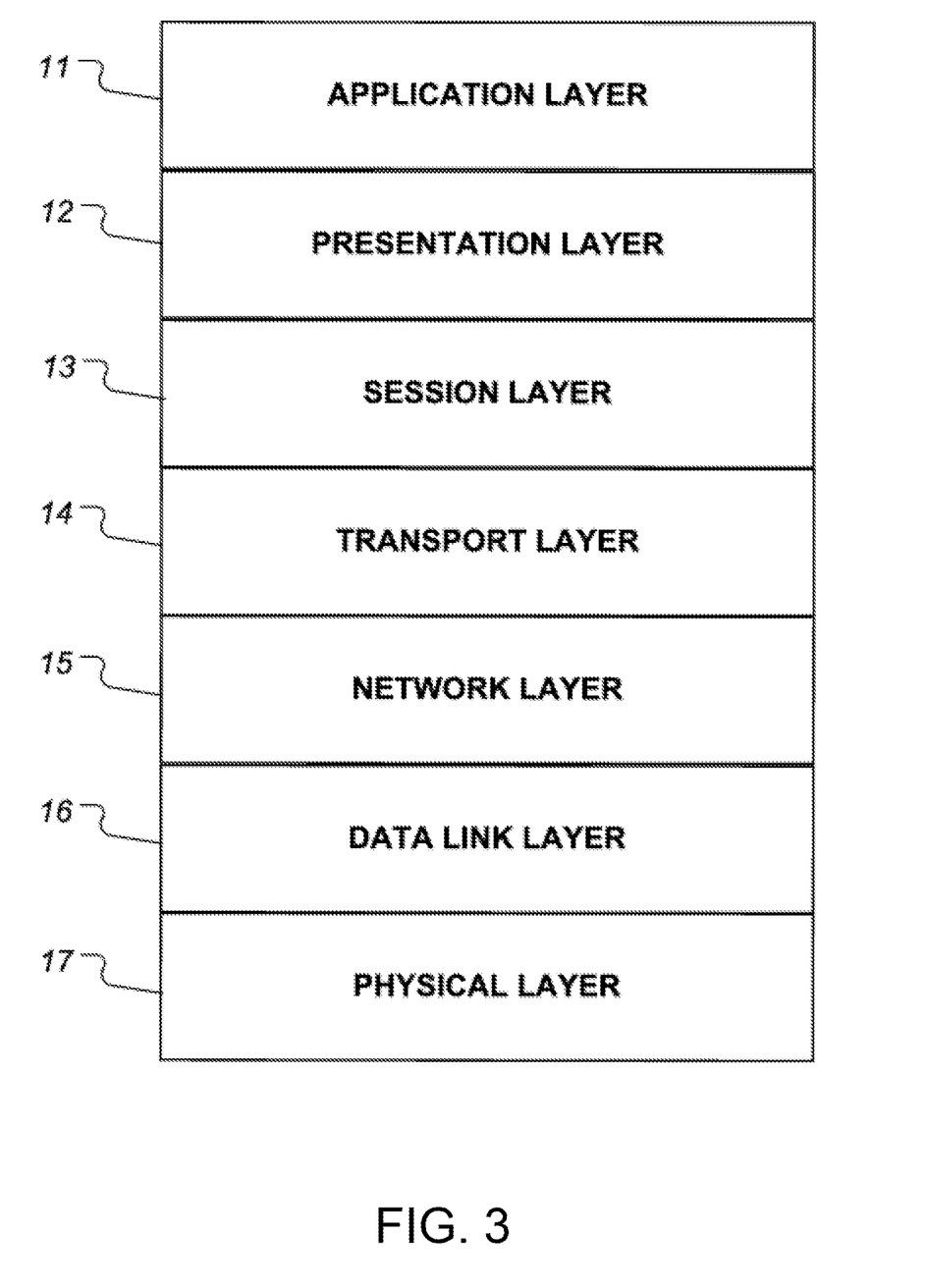
FIG. 3 depicts an example of the seven-layer Open Systems Interconnection (OSI) model.

FIG. 3 shows a representation of the seven-layer OSI model. The various computing devices in the BC generator 30 can operate at the application layer 11, presentation layer 12, session layer 13, transport layer 14, network layer 15, link layer 16, or physical layer 17. For instance, the application layer 11 is the OSI layer in a computing device that is closest to the user. The application layer 11 interacts with computer resources in the computing device that implement a communicating component. The application layer 11 can include, for example, a graphic user interface (GUI) or other computing resource with which the user can interact to carry out a functionality.

The presentation layer 12 establishes context between computer resources, which might use different syntax and semantics. The presentation layer 12 transforms data into a form that each computer resource can accept. An operating system is an example of the presentation layer 12.

The session layer 13 controls the connections between computing devices in the BC generator 30, including, for example, the server suite 31, core layer switching and distribution layer 32, routers 33, or network switches 34. The session layer 13 can control the connection between the computing devices in the BC generator 30 and communicating devices 10 or content provider server 40 (shown in FIG. 1). This layer is responsible for establishing, managing, and terminating connections between local and remote computer resources. The layer can provide for full-duplex, half-duplex, or simplex operations, and is responsible for establishing checkpointing, adjournment, termination, and restart procedures.

The transport layer 14 provides the functional and procedural mechanisms for transferring variable-length data packets (or sequences) from one computing device to another computing device, while maintaining quality-of-service (QoS). The transport layer 14 controls the reliability of a given connectivity link through flow control, segmentation and desegmentation, and error control. The transport layer 14 can include, for example, tunneling protocols, the Transmission Control Protocol (TCP) and the User Datagram Protocol (UDP).

The network layer 15 provides the functional and procedural mechanisms for transferring data packets from a computing device on a network to another computing device on a different network. If the data to be transmitted is too large, the network layer 15 can facilitate splitting the data into a plurality of segments at the computing device and sending the fragments independently to the other computing device, where the segments can be reassembled to recreate the transmitted data. The network layer 15 can include one or more layer-management protocols such as, for example, routing protocols, multicast group management, network layer information and error, and network layer address assignment.

The link layer 16 is responsible for device-to-device transfer between computing devices in the user environment 1, including the BC generator 30. In IEEE 802 implementations, the link layer 16 is divided into two sublayers, consisting of a medium access control (MAC) layer and a logical link control (LLC) layer. The MAC layer is responsible for controlling how devices in the network gain access to a medium and permission to transmit data. The LLC layer is responsible for identifying and encapsulating network layer protocols, and for controlling error checking and frame synchronization.

The physical layer 17 includes the hardware that connects the computing devices in the user environment 1, including the BC generator 30. The hardware can include for example connectors, cables, or switches that provide for transmission and reception of instruction and data streams between the computing devices.

Figure 4:
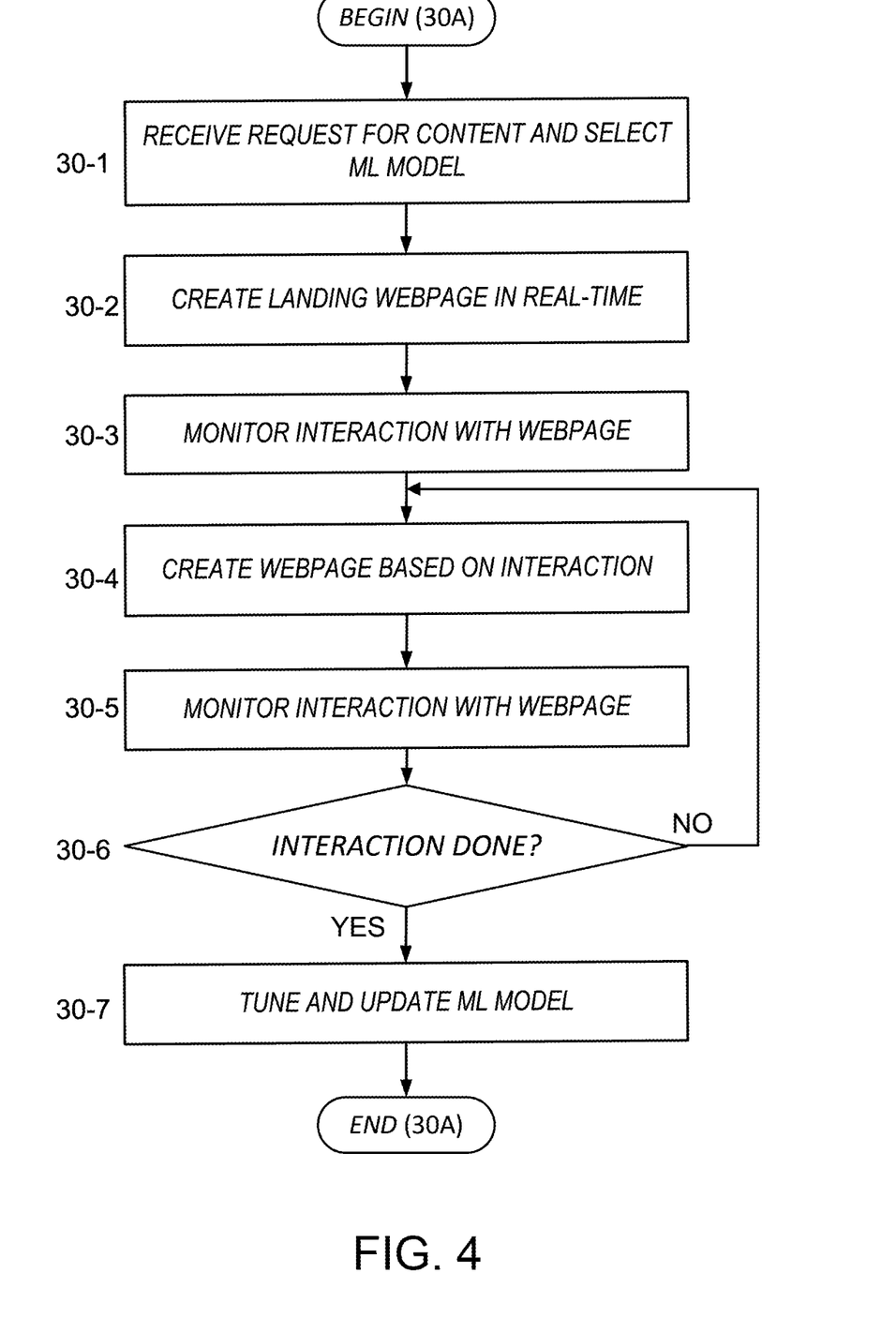
FIG. 4 depicts an embodiment of a content customization process that can be carried out by a bespoke content generator, according to the principles of the disclosure.

FIG. 4 depicts an embodiment of a content customization process 30A that can be carried out by the BC generator 30 (shown in FIGS. 1 and 2) in response to receiving a request from a communicating device 10 to access a computer resource selected by an end-user (Step 30-1). The computer resource can include audio-visual content such as, for example, advertising content displayed/reproduced by the communicating device 10. The computer resource can include code such as a Uniform Resource Locator (URL) address hosted by the BC generator 30. In various embodiments, the BC generator 30 can include, for each hosted URL address, the associated multimedia content and computer resources necessary for a browser to display/reproduce the audio-visual content on the computing device 10.

Based on the received access request, the UPR engine 30E can create a landing webpage on-the-fly and in real-time (Step 30-2). The landing webpage can be created based on historical data for all previously converted end-users related to the same computer resource or a similar followed computer resource. The landing webpage can be created by the UPR engine 30E according a previously trained and validated ML model, which can be parametrically tuned and updated by the UPR engine 30E in each instance that an end-user accesses computer resources hosted by the BC generator 30.

In an embodiment, the UPR engine 30E can take existing real-time and latent data to understand the particular end-user from which the original request was received.

In various embodiments, the UPR engine 30E can include a plurality of ML models. The ML model can be retrieved and applied based on, for example, the received access request (in Step 30-2). Each ML model can be associated with, for example, a particular advertising campaign, multimedia content, or particulars about the communicating device 10 from which the request originated such as, for example, device location, device type, or browser type.

In an embodiment, the UPR engine 30E can be configured to communicate with the database server 31-5 (shown in FIG. 2) and retrieve computer resources, including computer-executable code and data, necessary to reproduce the landing page with requested audio-visual content on the computing device 10.

The user's interaction with the webpage can be monitored (Step 30-3) and, based on the interaction, a subsequent webpage can be created (Step 30-4) and the interactions with that webpage monitored (Step 30-5). A determination can be made whether interaction has ended (Step 30-6), such as, for example, when the communication session between the communicating device 10 and BC generator 30 is terminated.

The UPR engine 30E can be configured to monitor each user interaction and learn each user's interests in real-time, continuously tuning and updating the ML model parametrically to create new content pathways for subsequent webpage creation. The UPR engine 30E can be configured to interact with the database server 31-5 and record all interactions.

If it is determined that the webpage is being interacted with (NO at Step 30-6), then the content customization process 30A can create a webpage on-the-fly based on the interaction and the UPR engine 30E can continue to monitor, create webpages, and learn the user's interests in real-time to create new content pathways.

If it is determined that the interactions are done (YES at Step 30-6), then the session, including all interactions, can be recorded and the ML model tuned and updated parametrically (Step 30-7) to be able to create new content pathways in subsequent interactions with other communicating devices 10.

Figure 5:
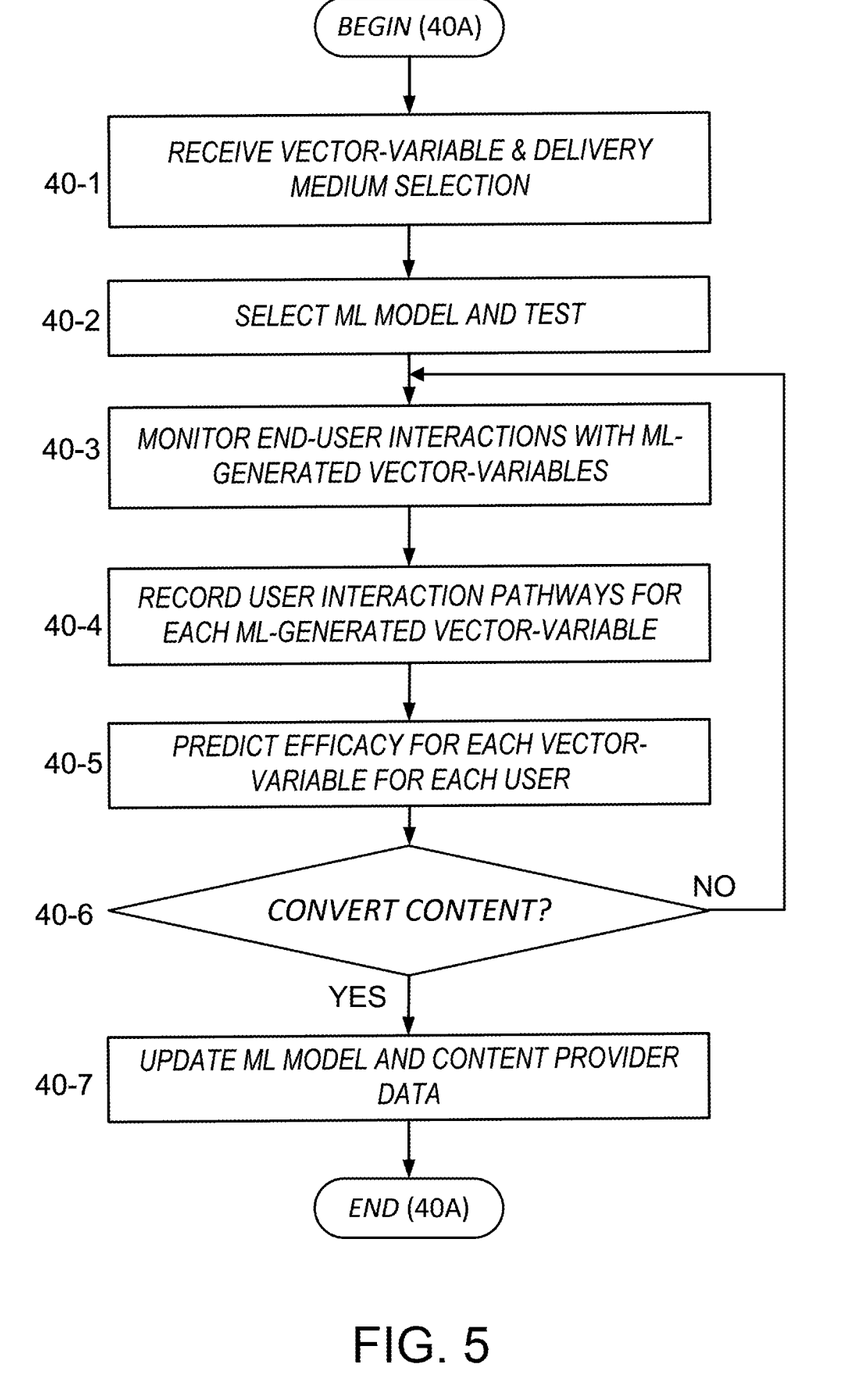
FIG. 5 depicts an embodiment of a testing process that can be carried out by a bespoke content generator, according to the principles of the disclosure.

FIG. 5 depicts an example of a testing process 40A that can be carried out by the BC generator 30 interacting with the content provider server 40 and/or communicating device 10 (shown in FIG. 1), according to the principles of the disclosure. The testing process 40A can be carried out, for example, before conversion of content such as new ad content. The testing process 40A can be carried out to test efficacy of content with respect to each end-user and different audiences of end-users, such as, for example, an advertisement campaign with respect to one or more audiences of end-users.

A request can be received by the UPR engine 30E from, for example, a content provider via the content provider server 40 or the communicating device 10 to test a particular vector-variable within a particular delivery medium, such as, for example, an advertisement, a website, or other channel of electronic content delivery (Step 40-1). The request can include the particular vector-variable to be tested and the delivery medium in which it is to be tested.

Based on the received request, the UPR engine 30E can take existing real-time and latent data and, by selecting and implementing an ML model related to the content provider or content, understand the individual content provider and/or content (Step 40-2). Based on the understanding, the ML model can be applied by the UPR engine 30E and a campaign launched to construct one or more webpages optimized for that content provider, and content optimized for specific end-users or audiences of end-users (Step 40-3). In an embodiment, the UPR engine 30E can carry out the content customization process 30A (shown in FIG. 4) at Step 40-3.

The UPR engine 30E can autogenerate, by the ML model, vector-variables (as discussed above with respect to content customization process 30A) for each end-user that requests or access the campaign content, monitoring and recording each instance of end-user interactions with the ML model generated vector-variables (Step 40-4). The UPR engine 30E can then predict efficacy for each vector-variable for each end-user and across different audiences of end-users while personalizing the digital experience for conversion (Step 40-5).

A determination can be made if the content is ready for conversion (Step 40-6) and, if it is determined to be ready for conversion (YES at Step 40-6), the content can be approved, the ML model updated, and the content provider and end-user data interactions stored in, for example, the database server 31-5 (shown in FIG. 2) (Step 40-7); otherwise (NO at Step 40-6), the process can continue to test new ML-generated vector-variables and repeat Steps 40-3 to 40-6.

Figure 6:
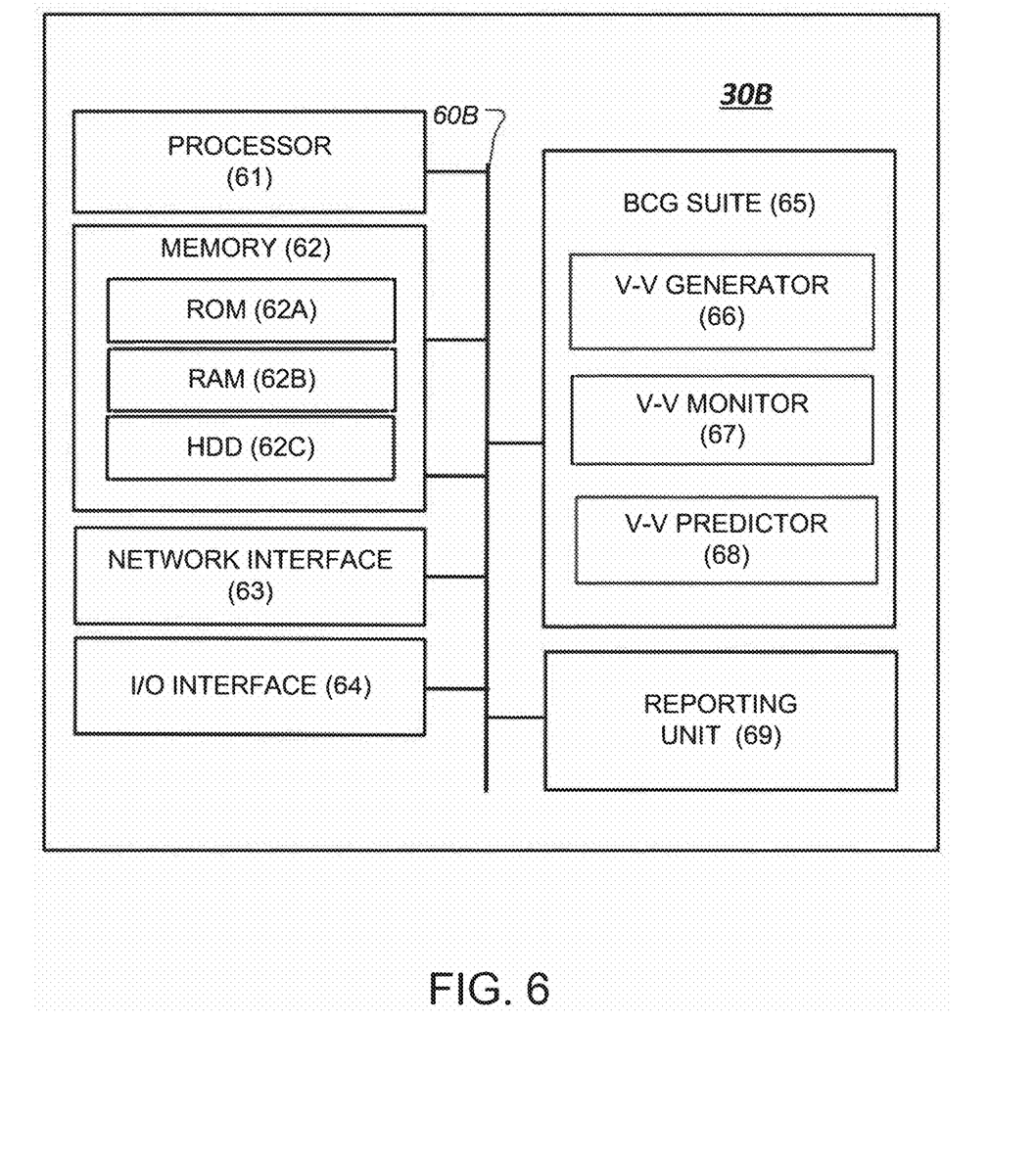
FIG. 6 depicts an embodiment of a bespoke content generator, according to the principles of the disclosure.

FIG. 6 depicts an embodiment of a BC generator 30B, according to the principles of the disclosure. In various embodiments, the BC generator 30B can be included in the BC generator 30 (shown in FIG. 1) or the BCG server 31-6 (shown in FIG. 2). The BC generator 30B can be implemented with any of the embodiments of the disclosed or contemplated herein.

The BC generator 30B can include a bus 60B, a processor 61, a memory 62, a network interface 63, an input-output (IO) interface 64, a vector-variable (V-V) generator 66, a vector-variable (V-V) monitor 67, a vector-variable (V-V) predictor 68 and a reporting unit 69. The V-V generator 66, V-V monitor 67, and/or V-V predictor 68 can be included as one or more computer resources or computing devices in the BCG suite 65. Any of the computing devices/computer resources in the BC generator 30B can be communicatively coupled to the bus 60B and/or can be mounted on a common motherboard or in another manner, as appropriate.

The processor 61 can be arranged to process instructions for execution within the BC generator 30B, including instructions stored in the memory 62. The processor 61 can be arranged to execute computer programming code or instructions to perform the methodologies disclosed herein. The processor 61 can include a computing device. The processor 61 can be arranged to interact with any of the components in the BC generator 30B to carry out or facilitate the processes disclosed herein.

The bus 60B can include any of several types of bus structures that can further interconnect to a memory bus (with or without a memory controller), a peripheral bus, and a local bus using any of a variety of commercially available bus architectures.

The memory 62 can include a read-only memory (ROM) 62A, a random-access memory (RAM) 62B, or a hard disk drive (HDD) 62C. The memory 62 can provide nonvolatile storage of data, data structures, and computer-executable instructions, and can accommodate the storage of any data or computer resources in a suitable digital format. The memory 62 can include a non-transitory computer-readable medium that can hold executable or interpretable computer code (or instructions) that, when executed by the processor 61, cause the BC generator 30B perform the processes provided by this disclosure.

A basic input-output system (BIOS) can be stored in the ROM 62A, which can include, for example, a non-volatile memory, an erasable programmable read-only memory (EPROM), or an electrically erasable programmable read-only memory (EEPROM). The BIOS can contain the basic routines that help to transfer information between any one or more of the components in the DCS controller 60, such as during start-up.

The RAM 62B can include dynamic random-access memory (DRAM), a synchronous dynamic random-access memory (SDRAM), a static random-access memory (SRAM), a nonvolatile random-access memory (NVRAM), or another high-speed RAM for caching data.

The HDD 62C can include any suitable hard disk drive. The HDD 62C can include a solid-state drive (SSD).

The BC generator 30B can include an ML platform and one or more ML models. The memory 62 can be configured to store ML training datasets and ML testing datasets for building and training an ML model. The ML model can be stored in the memory 62. In an embodiment, the ML platform can be configured to build and train a plurality of ML models to perform the operations disclosed herein. The ML model can be trained to detect and analyze incoming requests from the communicating devices 10 (shown in FIG. 1) or the content provider server 40 (shown in FIG. 1). The ML model can be trained to generate subsequent vector-variables on-the-fly and in real-time based on monitored interaction with a current vector-variable. The ML model can be trained to predict an efficacy for each vector-variable for each end-user, including an efficacy score that indicates a level of certainty with a score of 100 being absolute certainty of a predicted event and 0 being absolute certainty that a predicted event will not occur.

In various embodiments, the vector-variable can include audio-visual content, an advertisement, a webpage, or any multimedia content that can be generated or delivered electronically to the communicating device 10 (shown in FIG. 1). The V-V generator 66 can apply an ML model to, for example, audio-visual content in an ad campaign to generate artificial intelligence (AI) based variations of the content as AI-generated vector variables, which can be generated uniquely for each end-user on-the-fly based on that user's interaction with the content.

In an embodiment, the ML model can be loaded, for example, to the RAM 62B and run by the processor 61 executing computer resource processes on the ML platform. The training datasets can be updated periodically or continuously with updated parametric values, such as, for example, during parametric tuning of the ML model.

A computer program product can be tangibly embodied in the non-transitory computer-readable medium, which can be contained in the memory 62. The computer program product can contain instructions that, when executed, perform one or more methods or operations, such as those included in this disclosure.

Any number of computer resources can be stored in the memory 62, including, for example, a program module, an operating system, an application program, an API, or program data. The computing resource can include an API such as, for example, a Web API, a simple object access protocol (SOAP) API, a remote procedure call (RPC) API, a representation state transfer (REST) API, or any other utility or service API. Any (or all) of the operating system, application programs, APIs, program modules, and program data can be cached in the RAM 62B as executable sections of computer code.

The network interface 63 can be configured to connect to and communicate via the network 20. The network interface 63 can include a wired or a wireless communication network interface (not shown) or a modem (not shown). When used in a local area network (LAN), the network interface 63 can be connected to the LAN network through the wired or wireless communication network interface; and, when used in a wide area network (WAN), the network interface 63 can be connected to the WAN network through a modem. The modem (not shown) can be connected to the bus 60B. The network interface 63 can include a receiver (not shown) and a transmitter (not shown).

The IO interface 64 can receive commands or data from an operator via a user interface (not shown), such as, for example, a keyboard (not shown), a mouse (not shown), a pointer (not shown), a stylus (not shown), a microphone (not shown), a speaker (not shown), or a display device (not shown). The received commands and data can be forwarded from the IO interface 64 as instruction to data signals, via the bus 60B, to any of the computing devices/resources in the BG generator 30B.

The V-V generator 66 can configured to receive and analyze audio-visual content, by an ML model, and auto-generate AI-based vector-variables based on the content and user interaction data received from the V-V monitor 67. For example, the V-V generator 66 can be configured to generate the webpages in Steps 30-2 and 30-4 in FIG. 4. In an embodiment, the V-V generator 66 can be configured to select an ML model in Step 40-1 (shown in FIG. 5). The V-V generator 66 can be configured to select from one or more ML models based on the particular audio-visual content, end-user and/or content provider.

The V-V monitor 67 can be configured to monitor and record each interaction instance with each vector-variable and communicate with the V-V generator 66 and V-V predictor 68 to facilitate subsequent vector-variable generation (for example, one or more subsequent AI-generated webpages) by the V-V generator 66, and to facilitate efficacy prediction by the V-V predictor 68 for each vector-variable generated and interact with by end-users. In various embodiments, the V-V monitor 67 can be configured to perform the Steps 30-3 and 30-5 in FIG. 4 and Steps 40-3 and 40-4 in FIG. 5.

The V-V predictor 68 can be configured to generate an efficacy prediction and associated prediction score that indicates a likelihood that a predicted efficacy instance will occur for a give vector-variable. The V-V predictor 68 can be configured to determine when a particular content campaign is ready for conversion. In various embodiments, the V-V predictor 68 can be configured to perform the Steps 30-6 and 30-7 in FIG. 4 and Steps 40-5 to 40-7 in FIG. 5.

The reporting unit 69 can be configured to communicate with the BCG suite 65 and facilitate communication between the BC generator 30B and the communicating devices 10 and content provider server 40 (shown in FIG. 1). The reporting unit 69 can be configured to generate a GUI and a unique content dashboard for each content provider and end-user.

In an embodiment, the BC generator 30B includes the UPR engine 30E.

In an embodiment, the UPR engine 30E can include the BCG suite 65.

In various embodiments, the BC generator 30B can be arranged to communicate via the network 20 and, by executing image rendering commands, for example, in a web browser in communicating device 10, render multimedia content on a display device, for example, as one or more webpages. Each communicating device 10 can interface with the BC generator 30B and access and interact with multimedia content, for example, on a webpage or website. Each communicating device 10 can receive data or instructions from the BC generator 30, including, for example, JavaScript, to generate/render webpages on the communicating device 10.

In various embodiments, the BC generator 30B can generate image and sound rendering commands such as, for example, markup language annotations for identifying content and creating or modifying images, links, sounds, or other objects. The markup language annotations can include a plurality of tags for displaying static or moving content on the communicating device 10. The markup language can include, for example, one or more of: Standard Generalized Markup Language (SGML), Scalable Vector Graphics (SVG), Hypertext Markup Language (HTML), Extensible Markup Language (XHTML or XML), XML User Interface Language (XUL), LaTeX, or any other markup language that can be used by a client application such as, for example, a web browser on the communicating device 10 for rendering content on the display or speakers of the communicating device 10. The markup language annotations can be executed by, for example, the web browser running on the communicating device 10.

The rendering commands can include style sheet language annotations for providing rules for stylistics and for describing the presentation of the computer asset with the markup language annotations. The style sheet language annotations can include, for example, colors, fonts, layouts, or other stylistic properties. The style sheet language can include, for example, one or more of: Cascading Style Sheet (CSS), Document Style Semantics and Specification Language (DSSSL), or Extensible Stylesheet Language (XSL). The style sheet language annotations can be provided as a style sheet language file. Alternatively, the style sheet language annotations can be incorporated into a file containing the markup language annotations.

The rendering commands can include scripting language instructions to create interactive effects related to the markup language annotations or style sheet language annotations. The scripting language can include, for example, Bash (e.g., for Unix operating systems), ECMAScript (or JavaScript) (e.g., for web browsers), Visual Basic (e.g., for Microsoft applications), Lua, or Python. The scripting language instructions can include instructions that, when executed by client application such as, for example, the web browser on the communicating device 10, effectuate rendering of content (including AI-generated variable-vectors) as one or more webpages on the display device of the communicating device 10.

The scripting language instructions can rely on a run-time environment such as a client application on the communicating device 10 (such as, for example, the web browser) to provide objects and methods by which scripts can interact with the environment, such as, for example, a webpage document object model (DOM) that can work with an XML or HTML document. The scripting language instructions can rely on the run-time environment to provide the ability to include or import scripts, such as for example, HTML <script> elements. The scripting language instructions can include, for example, JavaScript instructions that can effectuate processing by a JavaScript engine from a queue one at a time. For instance, JavaScript can call a function associated with a vector-variable and create a call stack frame with the function's arguments and local variables. The call stack can shrink and grow based on the function's needs. When the call stack is empty upon function completion, JavaScript can proceed to the next variable in the queue.

The scripting language instructions can be used by the end-user web browser on the communicating device 10 to process the computer resources into a plurality of rows or columns of pixel data and display the computer resources as one or more webpages. The image rendering commands can include a document object model (DOM) such as for HTML or XML (e.g., DOM5 HTML) that can create object-oriented representations of a webpage that can be modified with the scripting language instructions. A DOM can include a cross-platform or language-independent convention for representing and interacting with objects in HTML, XHTML/XML, SGML, SVG, or XUL.

In an embodiment, an end-user can access the BC generator 30B via the communicating device 10 and enter a site, for example, a website hosted by the BCG server 31-6 (shown in FIG. 2). The site can be accessed and entered by the content provider server 40. The UPR engine 30E can create one or more home pages based on, for example, an interest level of all previously converted users from the same or similar followed generated multimedia content. As the user moves around in the site, the UPR engine 30E can create subsequent pages, with pages being generated as the user moves through the site based on interest levels of previously converted users who followed a similar virtual journey. As the user travels through the site and completes a journey, the UPR engine 30E can create bespoke multimedia content of each following page, while learning each user's interests in real-time to create new content pathways.

In an embodiment, the content provider server 40 can create personalized digital experiences for each end-user at a communicating device 10. The content provider (CP) can decide which content to test within, for example, advertisements, websites, or any multimedia content delivery channel. The CP can, via the content provider server 40, interact with, and the UPR engine 30E can ingest existing real-time and latent content to understand each individual user. The UPR engine 30E can then construct bespoke content, including, for example, web pages, optimized to each individual user, and content, such as, for example, advertisements, optimized for a specific grouping of users. Bespoke content can include a vector-variable, including an AI-generated vector-variable. The UPR engine 30E can autogenerate the bespoke content (for example, vector-variables, including audio-visual content) as a multitude of variations of the ingested content tailored to each user in the user environment 1. The UPR engine 30E can autonomously update the parametric values of its ML models based on the outcome and optimize the models for the next interaction on the individual and group level.

The UPR engine 30E can be arranged to run attribution models across hundreds, thousands or more touch points. Based on the attribution models, the UPR engine 30E can assign weights or scores to types of bespoke content, with such weights or scores being representative of the demand or predicted demand by users in the user environment 1. The generated bespoke content can include video content, audio content, or textual content tailored to each user, including the manner in which the bespoke content is generated, transmitted or rendered by the communicating device 1.

Figure 7:
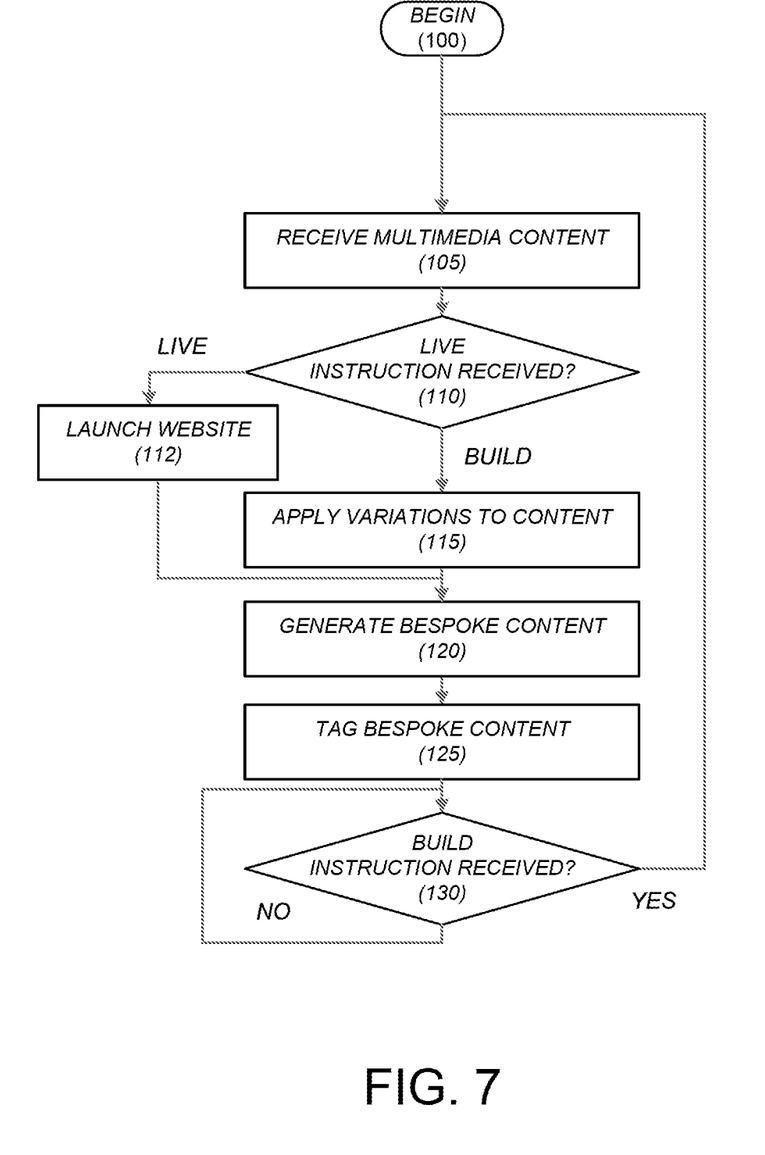
FIG. 7 depicts an embodiment of a bespoke content generation process, according to the principles of the disclosure.

FIG. 7 depicts an embodiment of a bespoke content generation process 100, according to the principles of the disclosure. Initially, multimedia content can be received by the BC generator 30 from one or more of the communicating devices 10 or the content provider server 40 (Step 105). In an embodiment, the multimedia content can be retrieved or received from database server 31-5 (shown in FIG. 2). In another embodiment, the multimedia content can be retrieved or received from the content provider server 40 (shown in FIG. 1). In another embodiment, the multimedia content can be hosted in the BC generator 30 or accessed by the content provider server 40 through a GUI on a computing device 10. The multimedia content can include video content, audio content, textual content, data, or computer instructions.

In an embodiment, the multimedia content can include bespoke content previously generated by the BC generator 30. The multimedia content can include a data field comprising an instruction such as, for example, LIVE or BUILD bespoke content. In an embodiment, the instruction can be received, for example, from the computing device in the content provider server 40, such as by means of the GUI. If the multimedia content does not include such an instruction, or the instruction is not received from the computing device or content provider server 40, then the multimedia content can be determined to be BUILD bespoke content by default.

If a BUILD bespoke content instruction is determined (BUILD at Step 110), then a multitude of variations (or vector-variables) can be autogenerated and applied to the multimedia content by the UPR engine 30E to generate bespoke content (Step 115). In this regard, the UPR engine 30E can apply one more ML models, which can be included in an API, that can generate, for example, tens, hundreds, thousands, or more variations (vector-variables) of the original multimedia content. Based on whether a LIVE bespoke content instruction is determined (Step 110), the multimedia content can be determined LIVE and, for example, a website launched with the bespoke content (LIVE at Step 110, then Step 112). If a BUILD bespoke content instruction is determined (BUILD at Step 110), then a multitude of bespoke content variations can be generated by applying the ML model(s) by the UPR engine 30E to the multimedia content (Step 115).

After the web site is launched (Step 112) or the multitude of content variations generated (Step 115), the bespoke content can be generated (Step 120) and accordingly tagged with an annotation in a data field to indicate whether a particular piece of content was, for example, liked or disliked by the content provider (Step 125). The bespoke content can be generated, including the tag, and a determination made whether further multimedia content or a further instruction to build bespoke content is received from the content provider serve 40 (Step 130). If further media content is received, or a further instruction to build bespoke content is received or determined (YES at Step 130, then Step 105), otherwise the BC Generator 30 can either ping the content provider server 40 or wait to receive the further multimedia content or build bespoke content instruction (NO at Step 130).

The terms "a," "an," and "the," as used in this disclosure, means "one or more," unless expressly specified otherwise.

The term "backbone," as used in this disclosure, means a transmission medium that interconnects one or more computing devices or communicating devices to provide a path that conveys data signals and instruction signals between the one or more computing devices or communicating devices. The backbone can include a bus or a network. The backbone can include an ethernet TCP/IP. The backbone can include a distributed backbone, a collapsed backbone, a parallel backbone, or a serial backbone.

The term "bus," as used in this disclosure, means any of several types of bus structures that can further interconnect to a memory bus (with or without a memory controller), a peripheral bus, or a local bus using any of a variety of commercially available bus architectures. The term "bus" can include a backbone.

The terms "communicating device" and "communication device," as used in this disclosure, mean any hardware, firmware, or software that can transmit or receive data packets, instruction signals, data signals, or radio frequency signals over a communication link. The device can include a computer or a server. The device can be portable or stationary.

The term "communication link," as used in this disclosure, means a wired or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, WiFi, WiMAX, IEEE 802.11, DECT, 0G, 1G, 2G, 3G, 4G, or 5G cellular standards, or Bluetooth. A communication link can include, for example, an RS-232, RS-422, RS-485, or any other suitable serial interface.

The terms "computer," "computing device," or "processor," as used in this disclosure, means any machine, device, circuit, component, or module, or any system of machines, devices, circuits, components, or modules that are capable of manipulating data according to one or more instructions. The terms "computer," "computing device" or "processor" can include, for example, without limitation, a communicating device, a computer resource, a processor, a microprocessor (μC), a central processing unit (CPU), a graphic processing unit (GPU), an application specific integrated circuit (ASIC), a general purpose computer, a super computer, a personal computer, a laptop computer, a palmtop computer, a notebook computer, a desktop computer, a workstation computer, a server, a server farm, a computer cloud, or an array or system of processors, μCs, CPUs, GPUs, ASICs, general purpose computers, super computers, personal computers, laptop computers, palmtop computers, notebook computers, desktop computers, workstation computers, or servers.

The terms "computing resource" or "computer resource," as used in this disclosure, mean software, a software application, a web application, a web page, a computer application, a computer program, computer code, machine executable instructions, firmware, or a process that can be arranged to execute on a computing device as one or more processes.

The term "computing resource process," as used in this disclosure, means a computing resource that is in execution or in a state of being executed on an operating system of a computing device. Every computing resource that is created, opened, or executed on or by the operating system can create a corresponding "computing resource process." A "computing resource process" can include one or more threads, as will be understood by those skilled in the art.

The term "computer-readable medium," as used in this disclosure, means any non-transitory storage medium that participates in providing data (for example, instructions) that can be read by a computer. Such a medium can take many forms, including non-volatile media and volatile media. Non-volatile media can include, for example, optical or magnetic disks and other persistent memory. Volatile media can include DRAM. Common forms of computer-readable media include, for example, a floppy disk, a flexible disk, a hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "cloud," which can include a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards, or protocols, including, for example, WiFi, WiMAX, IEEE 802.11, DECT, 0G, 1G, 2G, 3G, 4G, or 5G cellular standards, or Bluetooth.

The term "database," as used in this disclosure, means any combination of software or hardware, including at least one computing resource or at least one computer. The database can include a structured collection of records or data organized according to a database model, such as, for example, but not limited to at least one of a relational model, a hierarchical model, or a network model. The database can include a database management system application (DBMS). The at least one application may include, but is not limited to, a computing resource such as, for example, an application program that can accept connections to service requests from communicating devices by sending back responses to the devices. The database can be configured to run the at least one computing resource, often under heavy workloads, unattended, for extended periods of time with minimal or no human direction.

The terms "including," "comprising" and their variations, as used in this disclosure, mean "including, but not limited to," unless expressly specified otherwise.

The term "network," as used in this disclosure means, but is not limited to, for example, at least one of a personal area network (PAN), a local area network (LAN), a wireless local area network (WLAN), a campus area network (CAN), a metropolitan area network (MAN), a wide area network (WAN), a metropolitan area network (MAN), a wide area network (WAN), a global area network (GAN), a broadband area network (BAN), a cellular network, a storage-area network (SAN), a system-area network, a passive optical local area network (POLAN), an enterprise private network (EPN), a virtual private network (VPN), the Internet, or the like, or any combination of the foregoing, any of which can be configured to communicate data via a wireless and/or a wired communication medium. These networks can run a variety of protocols, including, but not limited to, for example, Ethernet, IP, IPX, TCP, UDP, SPX, IP, IRC, HTTP, FTP, Telnet, SMTP, DNS, ARP, and ICMP.

The term "server," as used in this disclosure, means any combination of software or hardware, including at least one computing resource or at least one computer to perform services for connected communicating devices as part of a client-server architecture. The at least one server application can include, but is not limited to, a computing resource such as, for example, an application program that can accept connections to service requests from communicating devices by sending back responses to the devices. The server can be configured to run the at least one computing resource, often under heavy workloads, unattended, for extended periods of time with minimal or no human direction. The server can include a plurality of computers configured, with the at least one computing resource being divided among the computers depending upon the workload. For example, under light loading, the at least one computing resource can run on a single computer. However, under heavy loading, multiple computers can be required to run the at least one computing resource. The server, or any if its computers, can also be used as a workstation.

The terms "send," "sent," "transmission," or "transmit," as used in this disclosure, means the conveyance of data, data packets, computer instructions, or any other digital or analog information via electricity, acoustic waves, light waves, or other electromagnetic emissions, such as those generated with communications in the RF or infrared (IR) spectra. Transmission media for such transmissions can include coaxial cables, copper wire, and fiber optics, including the wires that comprise a system bus coupled to the processor.

Devices that are in communication with each other need not be in continuous communication with each other unless expressly specified otherwise. In addition, devices that are in communication with each other may communicate directly or indirectly through one or more intermediaries.

Although process steps, method steps, or algorithms may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods, or algorithms described in this specification may be performed in any order practical.

When a single device or article is described, it will be readily apparent that more than one device or article may be used in place of a single device or article. Similarly, where more than one device or article is described, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A system for creating bespoke content tailored to each user in a user environment, the system comprising:
    a bespoke content generator configured to autogenerate and test bespoke content in real-time; and
    at least one machine learning platform configured to:
        store a plurality of stored machine learning models;
        retrieve a machine learning model, from the plurality of machine learning models, based on a request sent to the system, wherein the machine learning model is a generative pre-trained transformer;
        autogenerate a landing webpage based on an interest level of all previously converted users from a same or similar followed generated multimedia content, wherein the landing webpage comprises a vector-variable autogenerated by the machine learning model of the machine learning platform, and the vector-variable is a variation of the same or similar followed multimedia content, and the vector-variable is ai-generated multimedia content as generated as a multimedia content output of the generative pre-trained transformer;
        monitor interaction with the landing webpage by a communicating device; and
        autogenerate on-the-fly and in real-time one or more subsequent webpages based on the interaction,
    wherein the subsequent webpages are generated as the communicating device interacts with each webpage and progresses according to a predicted interaction trajectory.

2. The system in claim 1, wherein the bespoke content generator is configured to determine efficacy for each autogenerated webpage.

3. The system in claim 1, wherein the vector-variable is autogenerated by the machine learning model of the machine learning platform based on past interaction trajectories.

4. The system in claim 1, further comprising an interface configured to communicate with the communicating device and grant access to a site hosted on a bespoke content generator server.

5. The system in claim 1, wherein the at least one machine learning platform includes a vector-variable generator configured to autogenerate the landing webpage and the one or more subsequent webpages.

6. The system in claim 1, wherein the at least one machine learning platform includes a vector-variable monitor configured to monitor the interaction with the landing page.

7. The system in claim 1, wherein the at least one machine learning platform is further configured to:
    monitor interaction with each of the one more subsequent webpages by the communicating device; and
    autogenerate on-the-fly and in real-time one or more additional subsequent webpages based on the interaction and the predicted interaction trajectory.

8. A non-transitory computer-readable storage medium containing computer executable instructions that, when executed by a computing device, cause the computing device to interact with a communicating device and to perform a method, the method comprising:
    storing a plurality of stored machine learning models;
    receiving a request from the communicating device for content;
    retrieving a machine learning model, from the plurality of stored machine learning models, based on the request, wherein the machine learning model is a generative pre-trained transformer;
    autogenerating a landing webpage by the machine learning model, wherein the landing webpage comprises a vector-variable autogenerated by the machine learning model of a machine learning platform and the vector-variable is ai-generated multimedia content as generated as a multimedia output of the generative pre-trained transformer;
    monitoring interaction with the landing webpage by the communicating device;
    predicting an interaction trajectory for the communicating device;
    autogenerating on-the-fly one or more subsequent webpages based on the monitored interaction and the predicted interaction trajectory; and
    determining whether the vector variable is launchable on the Internet.

9. The non-transitory computer-readable storage medium in claim 8, the method further comprising:
    updating the machine learning platform, including parametric values for at least one interaction trajectory.

10. The non-transitory computer-readable storage medium in claim 8, the method further comprising:
    receiving vector-variable and delivery medium selection parameters from another communicating device.

11. The non-transitory computer-readable storage medium in claim 10, the method further comprising:
    predicting an efficacy of the received vector-variable and a plurality of vector-variables autogenerated by the machine learning platform.

12. The non-transitory computer-readable storage medium in claim 8, the method further comprising:
    monitoring interaction with each of the one more subsequent webpages by the communicating device; and autogenerating on-the-fly one or more additional subsequent webpages based on the interaction and the predicted interaction trajectory.

\* \* \* \* \*